United States Patent
Jeong

(10) Patent No.: US 10,929,055 B2
(45) Date of Patent: Feb. 23, 2021

(54) MEMORY SYSTEM AND OPERATING METHOD THEREOF

(71) Applicant: SK hynix Inc., Gyeonggi-do (KR)

(72) Inventor: Beom Rae Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/529,215

(22) Filed: Aug. 1, 2019

(65) Prior Publication Data

US 2020/0201557 A1 Jun. 25, 2020

(30) Foreign Application Priority Data

Dec. 21, 2018 (KR) ........................ 10-2018-0167683

(51) Int. Cl.
*G06F 3/06* (2006.01)
*G06F 12/02* (2006.01)
*G06F 12/08* (2016.01)
*G06F 12/0802* (2016.01)

(52) U.S. Cl.
CPC .......... *G06F 3/0652* (2013.01); *G06F 3/0611* (2013.01); *G06F 3/0659* (2013.01); *G06F 3/0679* (2013.01); *G06F 12/0246* (2013.01); *G06F 12/0802* (2013.01)

(58) Field of Classification Search
None
See application file for complete search history.

(56) References Cited

U.S. PATENT DOCUMENTS

| 9,959,204 | B1 * | 5/2018 | Lott | G06F 12/0246 |
| 2013/0080732 | A1 * | 3/2013 | Nellans | G06F 12/0246 711/206 |
| 2016/0098215 | A1 * | 4/2016 | Song | G06F 3/0619 711/103 |
| 2018/0024920 | A1 * | 1/2018 | Thomas | G06F 12/0246 711/103 |
| 2020/0042436 | A1 * | 2/2020 | Palmer | G06F 12/0246 |
| 2020/0065256 | A1 * | 2/2020 | Palmer | G06F 16/2246 |

FOREIGN PATENT DOCUMENTS

KR 101127686 3/2012

\* cited by examiner

*Primary Examiner* — Kaushikkumar M Patel
(74) *Attorney, Agent, or Firm* — IP & T Group LLP

(57) ABSTRACT

A memory system includes a nonvolatile memory device; and a controller configured to receive an operation command for a target logical address from a host device, and control the nonvolatile memory device in response to the operation command, wherein the controller determines a target logical address range including the target logical address among a plurality of logical address ranges, and determines whether the target logical address has a sequential attribute, based on a target count corresponding to the target logical address range among counts corresponding to the plurality of logical address ranges.

19 Claims, 9 Drawing Sheets

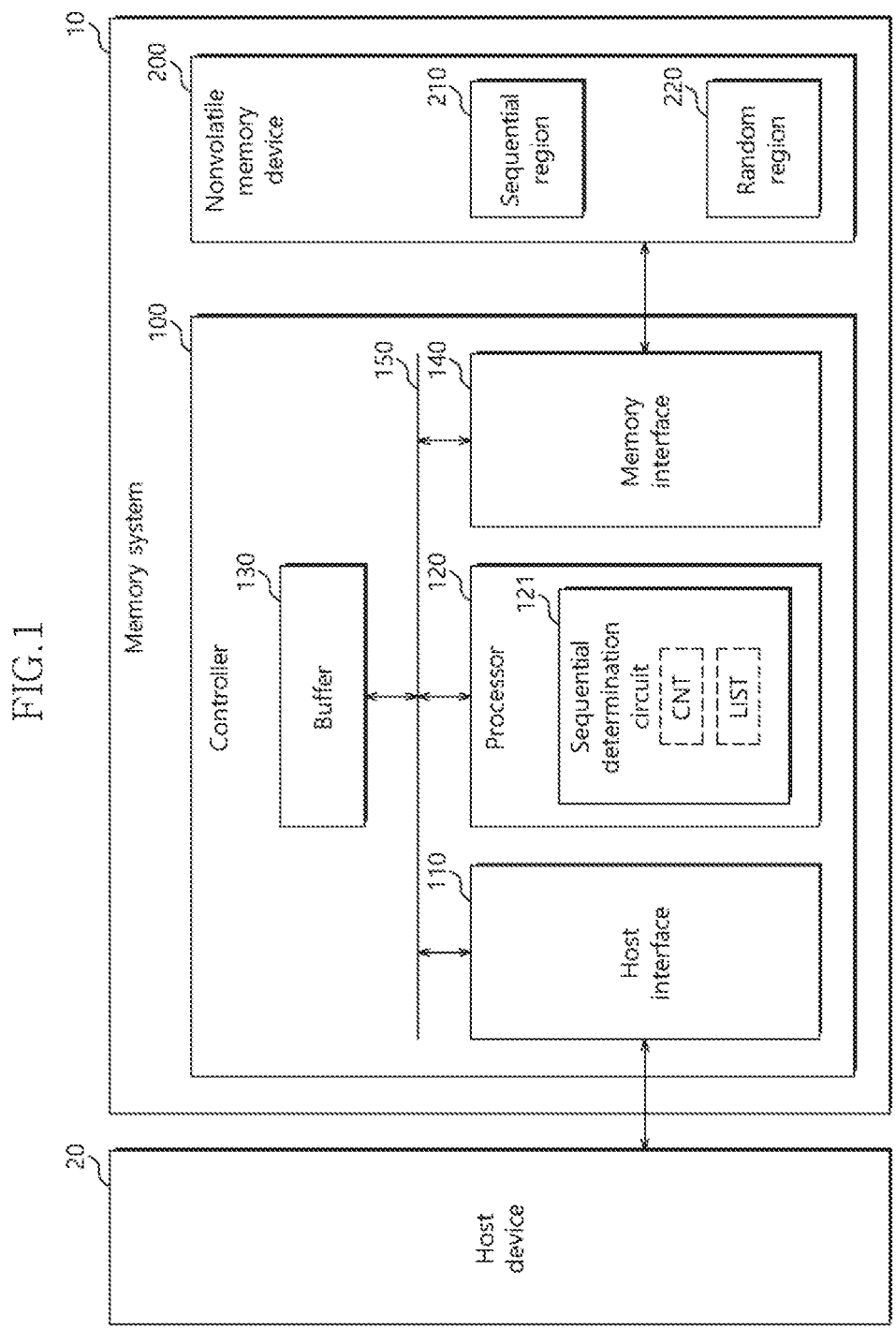

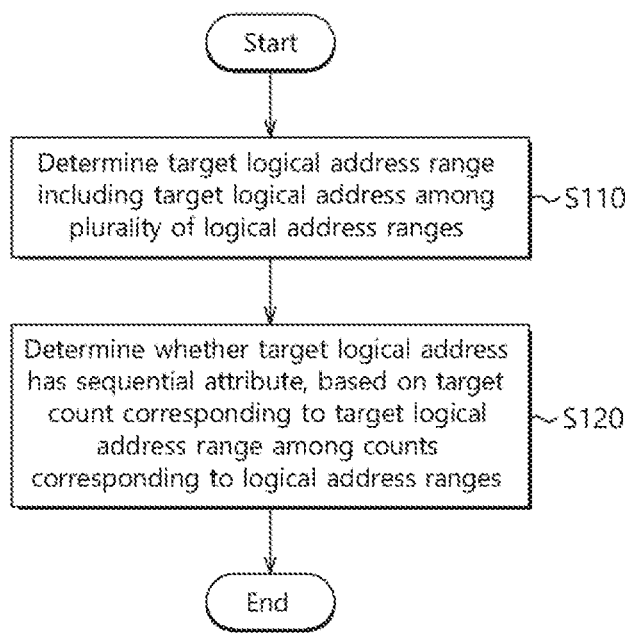

MEMORY SYSTEM AND OPERATING METHOD THEREOF

CROSS-REFERENCES TO RELATED APPLICATION

The present application claims priority under 35 U.S.C. § 119(e) to Korean application number 10-2018-0167683, filed on Dec. 21, 2018, which is incorporated herein by reference in its entirety.

BACKGROUND

1. Technical Field

Various embodiments generally relate to a memory system and, more particularly, to a memory system including a nonvolatile memory device.

2. Related Art

A memory system may be configured to store the data provided from a host device, in response to a write request from the host device. Also, the memory system may be configured to provide stored data to the host device, in response to a read request of the host device. The host device is an electronic device capable of processing data and may include a computer, a digital camera, a mobile phone or the like. The memory system may operate by being built in the host device, or may operate by being manufactured as a separable form and being coupled to the host device.

SUMMARY

Various embodiments are directed to a memory system and an operating method thereof, capable of efficiently sorting sequential data and random data.

In an embodiment, a memory system may include: a nonvolatile memory device; and a controller configured to receive an operation command for a target logical address from a host device, and control the nonvolatile memory device in response to the operation command, wherein the controller determines a target logical address range including the target logical address among a plurality of logical address ranges, and determines whether the target logical address has a sequential attribute, based on a target count corresponding to the target logical address range among counts corresponding to the plurality of logical address ranges.

In an embodiment, an operating method of a memory system may include: determining a target logical address range including a target logical address corresponding to an operation command received from a host device, among a plurality of logical address ranges; determining whether the target logical address has a sequential attribute, based on a target count corresponding to the target logical address range among counts corresponding to the plurality of logical address ranges.

In an embodiment, a memory system may include: a memory device; and a controller suitable for: receiving at least one command for the memory device and a sequence of logical addresses associated with the command; determining an address range corresponding to each of the logical addresses, among a plurality of logical address ranges; counting the number of each of the plurality of logical address ranges based on the determined address range; and determining whether each of the logical addresses is sequential, based on the counted number.

The memory system and the operating method thereof according to the embodiments may efficiently sort sequential data and random data.

BRIEF DESCRIPTION OF THE DRAWINGS

FIG. 1 is a block diagram illustrating a memory system in accordance with an embodiment.

FIG. 3 is a flow chart illustrating a method for operating a sequential determination circuit in accordance with an embodiment.

DETAILED DESCRIPTION

Figure 2A:
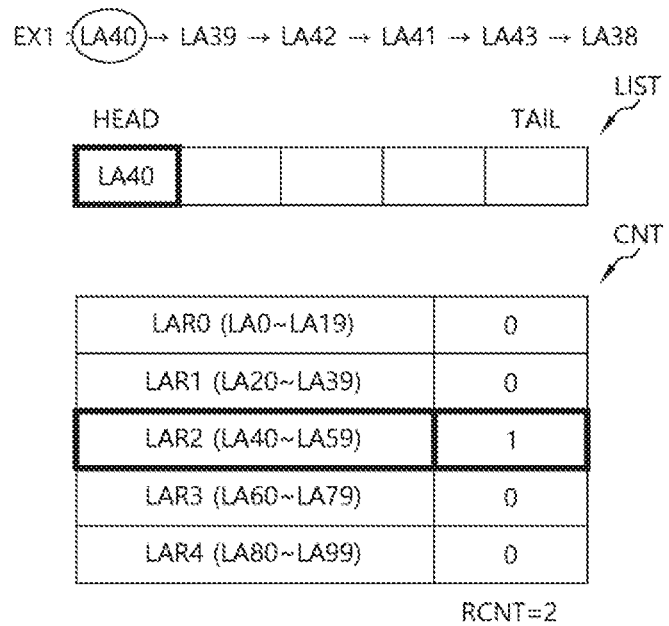
FIGS. 2A to 2F are diagrams illustrating examples of a method for operating a sequential determination circuit in accordance with an embodiment.

Hereinafter, a memory system and an operating method thereof are described below with reference to the accompanying drawings through various examples of embodiments.

In the present disclosure, advantages, features and methods for achieving the advantages will become more apparent after a reading of the following exemplary embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

FIG. 1 is a block diagram illustrating a memory system 10 in accordance with an embodiment.

Referring to FIG. 1, the memory system 10 may be configured to store data provided from a host device 20, in response to a write command of the host device 20. Also, the memory system 10 may be configured to provide stored data to the host device 20, in response to a read command of the host device 20.

The memory system 10 may be configured by a Personal Computer Memory Card International Association (PCM-CIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The memory system 10 may include a controller 110 and a nonvolatile memory device 200.

The controller 100 may control general operations of the memory system 10. The controller 100 may control the nonvolatile memory device 200 to perform a foreground operation depending on an operation command such as a write command and a read command of the host device 20. The foreground operation may include an operation of writing data in the nonvolatile memory device 200 and reading data from the nonvolatile memory device 200.

Further, the controller 100 may control the nonvolatile memory device 200 to perform a background operation that is internally required, independently of an operation command of the host device 20. The background operation may include a wear leveling operation, a garbage collection operation, and an erase operation for the nonvolatile memory device 200. Like the foreground operation, the background operation may also include an operation of writing data in the nonvolatile memory device 200, and reading data from the nonvolatile memory device 200.

The controller 100 may include a host interface 110, a processor 120, a buffer 130, a memory interface 140, and a bus 150. The host interface 110, the processor 120, the buffer 130, and the memory interface 140 may be coupled with one another through the bus 150.

The host interface 110 may communicate with the host device 20. The host interface 110 may receive an operation command for a target logical address, from the host device 20. The host interface 110 may transmit the operation command to the processor 120. Moreover, the host interface 110 may temporarily store write data transmitted from the host device 20, in the buffer 130, and may transmit read data transmitted from the nonvolatile memory device 200 and temporarily stored in the buffer 130, to the host device 20.

The processor 120 may control general operations of the controller 100. The processor 120 may process an operation command received from the host device 20, and thereby, may control an internal operation such as a write operation and a read operation of the nonvolatile memory device 200, through the memory interface 140. The processor 120 may include a sequential determination circuit 121 to be described below.

The buffer 130 may temporarily store write data and read data to be transmitted between the host device 20 and the nonvolatile memory device 200. Alternatively, the buffer 130 may be positioned outside the controller 100 unlike the illustration of FIG. 1.

The memory interface 140 may be coupled with the nonvolatile memory device 200, and may control an internal operation of the nonvolatile memory device 200 under the control of the processor 120. The memory interface 140 may transmit control signals for controlling the nonvolatile memory device 200, to the nonvolatile memory device 200. The memory interface 140 may transmit write data temporarily stored in the buffer 130, to the nonvolatile memory device 200, and may temporarily store read data received from the nonvolatile memory device 200, in the buffer 130.

Data provided from the host device 20 may have a sequential attribute or a random attribute. The sequential attribute may appear in large data which does not substantially change, for example, such as a photo and a moving image. The random attribute may appear in data which is frequently updated, for example, such as system data of the host device 20. Sequential data having the sequential attribute may be cold data, and random data having the random attribute may be hot data. In general, the host device 20 may manage sequential data by allocating successive logical addresses thereto.

The memory system 10 may effectively operate when distinguishably processing sequential data and random data. For example, as will be described later, the memory system 10 may sort data into sequential data or random data. Further, the memory system 10 may store the sequential data in a sequential region 210 of the nonvolatile memory device 200 and store the random data in a random region 220 of the nonvolatile memory device 200. In this way, when data having the same attribute are stored together, a count of performing a garbage collection operation may decrease, and an increase in an erase count of the nonvolatile memory device 200 may be suppressed, whereby the lifetime of the nonvolatile memory device 200 may be extended.

When it is determined that data to be read from the nonvolatile memory device 200 is sequential data, the memory system 10 may predict that the host device 20 will successively read sequential data and may prepare in advance.

Thus, the sequential determination circuit 121 may determine whether a target logical address of an operation command received from the host device 20 has a sequential attribute or not. When the target logical address has the sequential attribute, it may be determined that data corresponding to the target logical address is sequential data.

In detail, the sequential determination circuit 121 may determine a target logical address range including a target logical address among a plurality of logical address ranges. The plurality of logical address ranges may be ones that are obtained by dividing the entire logical addresses used by the host device 20 into a predetermined number of ranges. The sequential determination circuit 121 may determine whether the target logical address has a sequential attribute, based on a target count corresponding to the target logical address range among counts CNT corresponding to the plurality of logical address ranges, respectively.

In this regard, the sequential determination circuit 121 may increase the target count before or after determining whether the target logical address has a sequential attribute. In detail, the sequential determination circuit 121 may increase the target count, and may determine whether the target logical address has a sequential attribute, based on an increased target count. Alternatively, the sequential determination circuit 121 may first determine whether the target logical address has a sequential attribute, based on the target count, and then, may increase the target count. In the latter case, an increased target count may be referred to, when determining the attribute of a target logical address of a subsequent operation command.

The sequential determination circuit 121 may determine that the target logical address has a sequential attribute, when the target count is greater than or equal to a reference value. Conversely, the sequential determination circuit 121 may determine that the target logical address has a random attribute, when the target count is less than the reference value.

The sequential determination circuit 121 may further manage a history list LIST which has a preset size, to manage the counts CNT within a predetermined range. The history list LIST may include one or more logical addresses of one or more operation commands which are received from the host device 20 and are processed recently, that is, before a current time. Logical addresses included in the history list LIST may be arranged in the history list LIST in a sequence in which the logical addresses are processed in the processor 120. For example, the history list LIST may have the structure of a first-in first-out (FIFO) queue. Because a sequence in which the logical addresses are added to the history list LIST is the sequence in which the logical addresses are processed in the processor 120, it may be different from a sequence in which the logical addresses are received from the host device 20.

In detail, when the history list LIST is not full, the sequential determination circuit 121 may add a target logical address to the history list LIST and increase a target count.

When the history list LIST is full, the sequential determination circuit 121 may erase an oldest logical address in the history list LIST and decrease a count corresponding to a logical address range including the erased logical address among the counts CNT, before adding the target logical address. When adding the target logical address to the history list LIST after erasing the oldest logical address in the history list LIST, the sequential determination circuit 121 may increase a target count.

In such an example, the total of the counts CNT may be equal to the number of logical addresses included in the history list LIST. The total sum of the counts CNT may be managed within the preset size of the history list LIST, that is, a maximum number of logical addresses which can be included in the history list LIST.

In the meantime, a single operation command may be received from the host device 20, for one or more target logical addresses. The sequential determination circuit 121 may determine a sequential attribute for only one representative target logical address among the one or more target logical addresses of the single operation command, and may apply a result thereof to the remaining target logical addresses of the operation command. The representative target logical address may be, for example, an initial target logical address among the one or more target logical addresses of the single operation command. This may be because the capacity of a memory for storing the history list LIST and the counts CNT is limited.

For example, when a single operation command is received from the host device 20 for a target logical address 0 to a target logical address 9, the sequential determination circuit 121 may determine whether the initial target logical address 0 has a sequential attribute or a random attribute, by determining a target logical address range for only the initial target logical address 0 and then performing the above-described process. When it is determined that the initial target logical address 0 has a sequential attribute, the sequential determination circuit 121 may determine that the remaining target logical addresses of the operation command, that is, the target logical address 1 to the target logical address 9, have the sequential attribute.

An operating method of the above-described sequential determination circuit 121 will be described in detail with reference to FIGS. 2A to 2F.

The nonvolatile memory device 200 may store write data received from the memory interface 140, and read stored data and transmit the read data to the memory interface 140, under the control of the memory interface 140.

The nonvolatile memory device 200 may include the sequential region 210 and the random region 220. The sequential region 210 may be used to store sequential data. The random region 220 may be used to store random data. When it is determined by the sequential determination circuit 121 that data to be stored in the nonvolatile memory device 200 is sequential data or random data, the nonvolatile memory device 200 may store sequential data in the sequential region 210 and store random data in the random region 220, under the control of the memory interface 140.

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the memory system 10 includes one nonvolatile memory device 200, it is to be noted that the number of nonvolatile memory devices included in the memory system 10 is not limited thereto. When the memory system 10 includes a plurality of nonvolatile memory devices, each nonvolatile memory device may include the sequential region 210 and the random region 220. Alternatively, the sequential region 210 and the random region 220 may be positioned in different nonvolatile memory devices.

FIGS. 2A to 2F are diagrams illustrating a method for operating a sequential determination circuit in accordance with an embodiment, for example, the sequential determination circuit 121 of FIG. 1. Referring to FIGS. 2A to 2F, the history list LIST and the counts CNT which are managed by the sequential determination circuit 121 are illustrated as an example.

The history list LIST may have the structure of a first-in first-out (FIFO) queue. Therefore, FIGS. 2A to 2F illustrate a beginning and an end of the history list LIST. In FIGS. 2A to 2F, the size of the history list LIST is illustrated as 5. Because the size of the history list LIST is 5, the total sum of the counts CNT may be less than or equal to 5.

The counts CNT may correspond to logical address ranges LAR0 to LAR4, respectively. When the host device 20 uses logical addresses LA0 to LA99, the logical addresses LA0 to LA99 may be divided into the logical address ranges LAR0 to LAR4. Each of the logical address ranges LAR0 to LAR4 may include successive logical addresses. For example, the logical address range LAR0 may include the logical addresses LA0 to LA19, the logical address range LAR1 may include the logical addresses LA20 to LA39, the logical address range LAR2 may include the logical addresses LA40 to LA59, the logical address range LAR3 may include the logical addresses LA60 to LA79, and the logical address range LAR4 may include the logical addresses LA80 to LA99. The logical address ranges LAR0 to LAR4 may be configured by the same number of logical addresses as illustrated. Alternatively, the logical address ranges LAR0 to LAR4 may be configured by different numbers of logical addresses.

In FIGS. 2A to 2F, target logical addresses LA38 to LA43 may correspond to different six operation commands, respectively. Therefore, the sequential determination circuit 121 may determine target logical address ranges and increase counts CNT for the respective target logical addresses LA38 to LA43.

A sequence EX1 may be a sequence in which the target logical addresses LA38 to LA43 are processed in the processor 120. That is, the target logical address LA40 may be processed for the first time, the target logical address LA39 may be processed for the second time, the target logical address LA42 may be processed for the third time, the target logical address LA41 may be processed for the fourth time, the target logical address LA43 may be processed for the fifth time, and the target logical address LA38 may be processed for the last time.

The target logical addresses LA38 to LA43 may be logical addresses corresponding to sequential data. Namely, the target logical addresses LA38 to LA43 may have a sequential attribute. However, the target logical addresses LA38 to LA43 may be processed with the successiveness thereof broken as in the illustrated sequence EX1. For example, even though the target logical addresses LA38 to LA43 are sequentially received from the host device 20 while maintaining the successiveness thereof, the target logical addresses LA38 to LA43 may be stored as the illustrated sequence EX1 in the host interface 110 and be processed in the sequence EX1 by the processor 120. For another example, as the target logical addresses LA38 to LA43 are processed as a plurality of threads in the host device 20, the target logical addresses LA38 to LA43 may be received in the sequence EX1 from the host device 20 with the successiveness thereof broken already. Nevertheless, the sequential determination circuit 121 may effectively detect the sequential attribute of the target logical addresses LA38 to LA43 as in a method described below.

Hereunder, a method in which the target logical addresses LA38 to LA43 are processed will be described with reference to FIGS. 2A to 2F.

In FIG. 2A, when the target logical address LA40 is processed, the sequential determination circuit 121 may determine whether the history list LIST is full. Since the history list LIST is not full, the sequential determination circuit 121 may add the target logical address LA40 to the history list LIST. The sequential determination circuit 121 may increase a target count corresponding to a target logical address range LAR2 including the target logical address LA40. Since the target count "1" corresponding to the target logical address range LAR2 is less than a reference value RCNT "2", the sequential determination circuit 121 may determine that the target logical address LA40 has a random attribute.

Figure 2B:
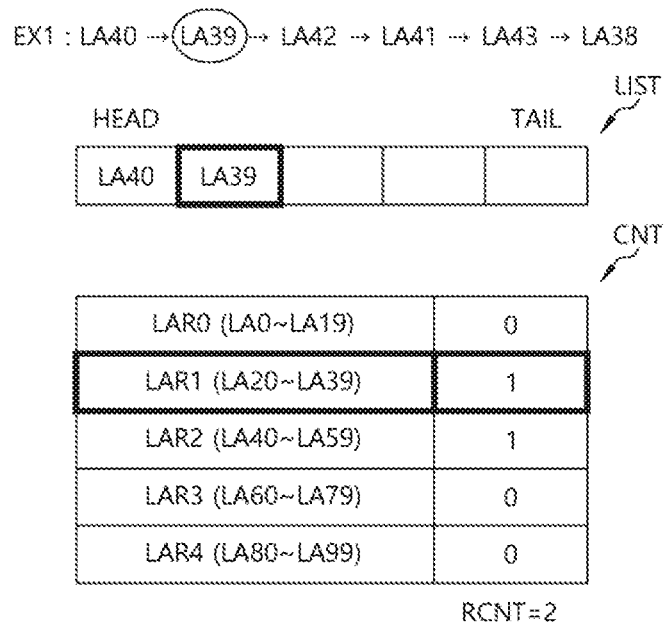

In FIG. 2B, when the target logical address LA39 is processed, the sequential determination circuit 121 may determine whether the history list LIST is full. Since the history list LIST is not full, the sequential determination circuit 121 may add the target logical address LA39 to the history list LIST. The sequential determination circuit 121 may increase a target count corresponding to a target logical address range LAR1 including the target logical address LA39. Since the target count "1" corresponding to the target logical address range LAR1 is less than the reference value RCNT "2", the sequential determination circuit 121 may determine that the target logical address LA39 has the random attribute.

Figure 2C:
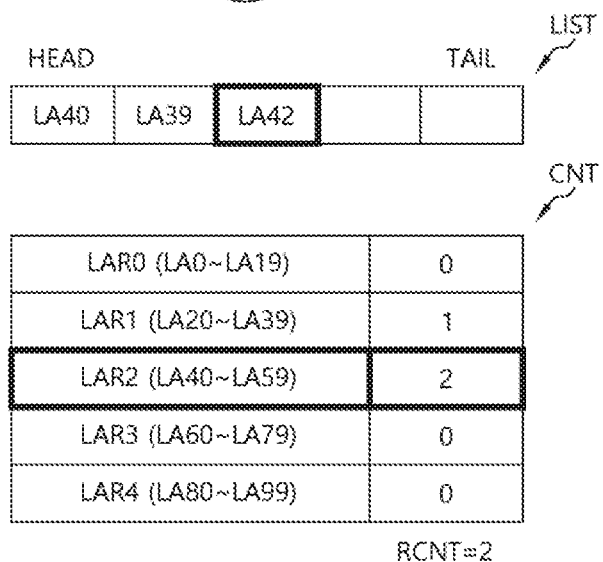

In FIG. 2C, when the target logical address LA42 is processed, the sequential determination circuit 121 may determine whether the history list LIST is full. Since the history list LIST is not full, the sequential determination circuit 121 may add the target logical address LA42 to the history list LIST. The sequential determination circuit 121 may increase a target count corresponding to a target logical address range LAR2 including the target logical address LA42. Since the target count "2" corresponding to the target logical address range LAR2 is equal to the reference value RCNT "2", the sequential determination circuit 121 may determine that the target logical address LA42 has a sequential attribute.

Figure 2D:
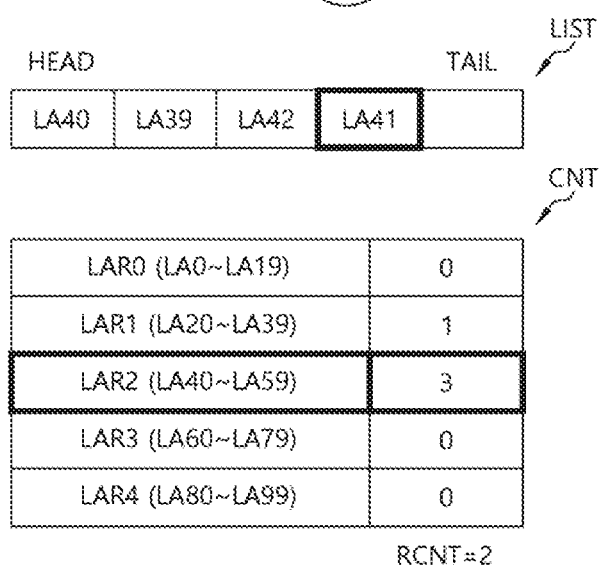

In FIG. 2D, when the target logical address LA41 is processed, the sequential determination circuit 121 may determine whether the history list LIST is full. Since the history list LIST is not full, the sequential determination circuit 121 may add the target logical address LA41 to the history list LIST. The sequential determination circuit 121 may increase a target count corresponding to a target logical address range LAR2 including the target logical address LA41. Since the target count "3" corresponding to the target logical address range LAR2 is greater than the reference value RCNT "2", the sequential determination circuit 121 may determine that the target logical address LA41 has the sequential attribute.

Figure 2E:
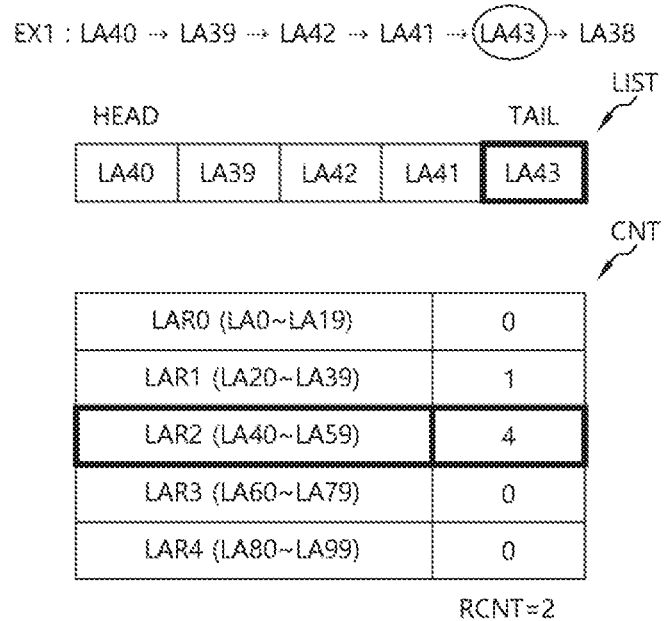

In FIG. 2E, when the target logical address LA43 is processed, the sequential determination circuit 121 may determine whether the history list LIST is full. Since the history list LIST is not full, the sequential determination circuit 121 may add the target logical address LA43 to the history list LIST. The sequential determination circuit 121 may increase a target count corresponding to a target logical address range LAR2 including the target logical address LA43. Since the target count "4" corresponding to the target logical address range LAR2 is greater than the reference value RCNT "2", the sequential determination circuit 121 may determine that the target logical address LA43 has the sequential attribute.

Figure 2F:
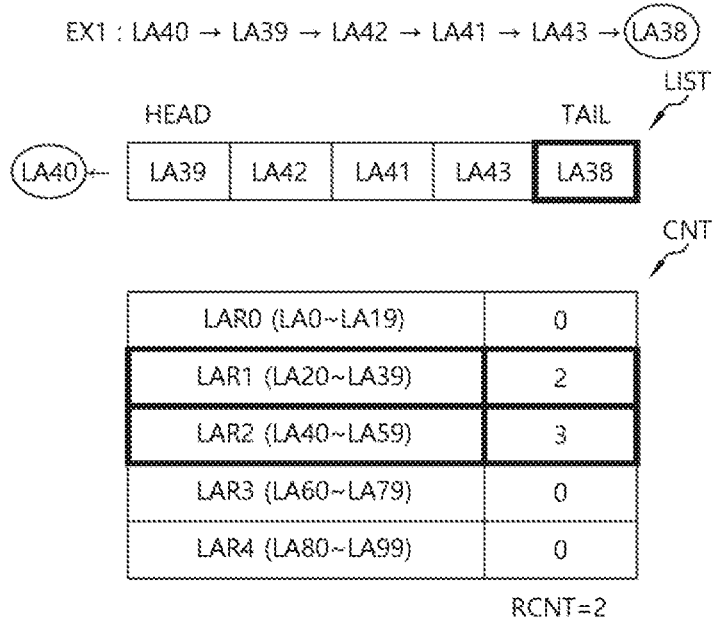

In FIG. 2F, when the target logical address LA38 is processed, the sequential determination circuit 121 may determine whether the history list LIST is full. Since the history list LIST is full, the sequential determination circuit 121 may erase the oldest logical address LA40 in the history list LIST, and may decrease a count corresponding to the logical address range LAR2 including the erased logical address LA40. Then, the sequential determination circuit 121 may add the target logical address LA38 to the history list LIST, and may increase a target count corresponding to a target logical address range LAR1 including the target logical address LA38. Since the target count corresponding to the target logical address range LAR1 "2" is equal to the reference value RCNT "2", the sequential determination circuit 121 may determine that the target logical address LA38 has the sequential attribute.

In summary, the embodiment may detect the sequential attribute of the target logical addresses LA38 to LA43 through the history list LIST and the counts CNT, and may process the target logical addresses LA38 to LA43 by determining whether data corresponding to the target logical addresses LA38 to LA43 are sequential data.

Meanwhile, any one of the process of adding a target logical address to the history list LIST and the process of increasing a target count corresponding to a target logical address range may precede the other.

In FIGS. 2A to 2F, the sequential determination circuit 121 increases a target count corresponding to a target logical address range, and determines the attribute of a target logical address based on the increased target count. Alternatively, the sequential determination circuit 121 may first determine the attribute of a target logical address based on a target count corresponding to a target logical address range and then increase the target count. According to this embodiment, in FIG. 2C, when the target logical address LA42 is processed, the sequential determination circuit 121 may compare a target count corresponding to the target logical address range LAR2, that is, 1, with the reference value RCNT. Since the target count corresponding to the target logical address range LAR2 is less than the reference value RCNT, the sequential determination circuit 121 may determine that the target logical address LA42 has the random attribute. Thereafter, the sequential determination circuit 121 may add the target logical address LA42 to the history list LIST, and may increase the target count corresponding to the target logical address range LAR2.

FIG. 3 is a flow chart illustrating a method for operating a sequential determination circuit in accordance with an embodiment, for example, the sequential determination circuit 121 of FIG. 1.

Referring to FIG. 3, at step S110, the sequential determination circuit 121 may determine a target logical address range among a plurality of logical address ranges. The target logical address range may include a target logical address of an operation command received from the host device 20.

At step S120, the sequential determination circuit 121 may determine whether the target logical address has a sequential attribute, based on a target count corresponding to the target logical address range among counts CNT corresponding to the logical address ranges. For example, the sequential determination circuit 121 may determine that the target logical address has a sequential attribute, when the target count is greater than or equal to a reference value. Conversely, the sequential determination circuit 121 may determine that the target logical address has a random attribute, when the target count is less than the reference value.

Figure 4A:
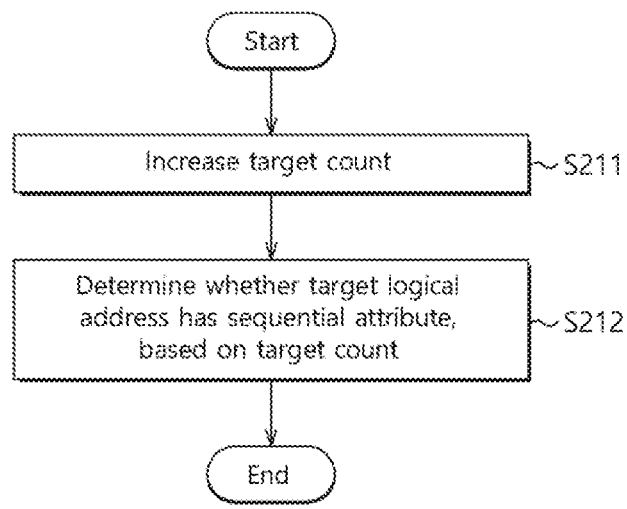
FIGS. 4A and 4B are flow charts illustrating a method for a sequential determination circuit to determine a sequential attribute of a target logical address based on a target count, in accordance with an embodiment.
Figure 4B:
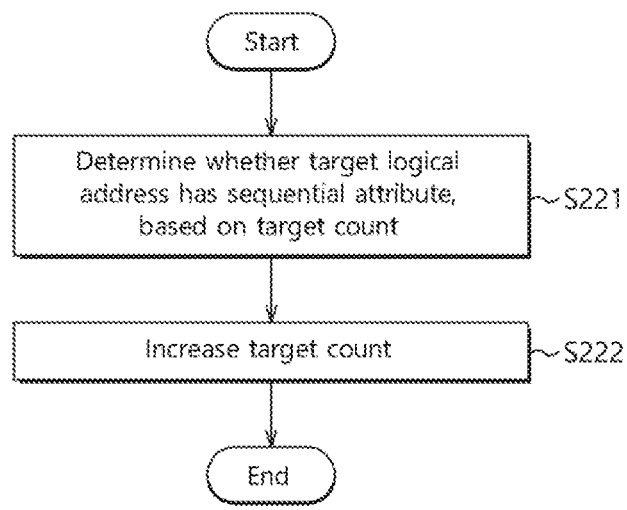

FIGS. 4A and 4B are flow charts illustrating a method for a sequential determination circuit to determine the sequential attribute of a target logical address based on a target count, in accordance with an embodiment, for example, the sequential determination circuit 121 of FIG. 1. For example, FIGS. 4A and 4B may be a detailed embodiment of the step S120 of FIG. 3.

Referring to FIG. 4A, at step S211, the sequential determination circuit 121 may increase the target count corresponding to the target logical address range.

At step S212, the sequential determination circuit 121 may determine whether the target logical address has the sequential attribute, based on the increased target count.

Referring to FIG. 4B, at step S221, the sequential determination circuit 121 may determine whether the target logical address has the sequential attribute, based on the target count corresponding to the target logical address range.

At step S222, the sequential determination circuit 121 may increase the target count corresponding to the target logical address range.

Figure 5:
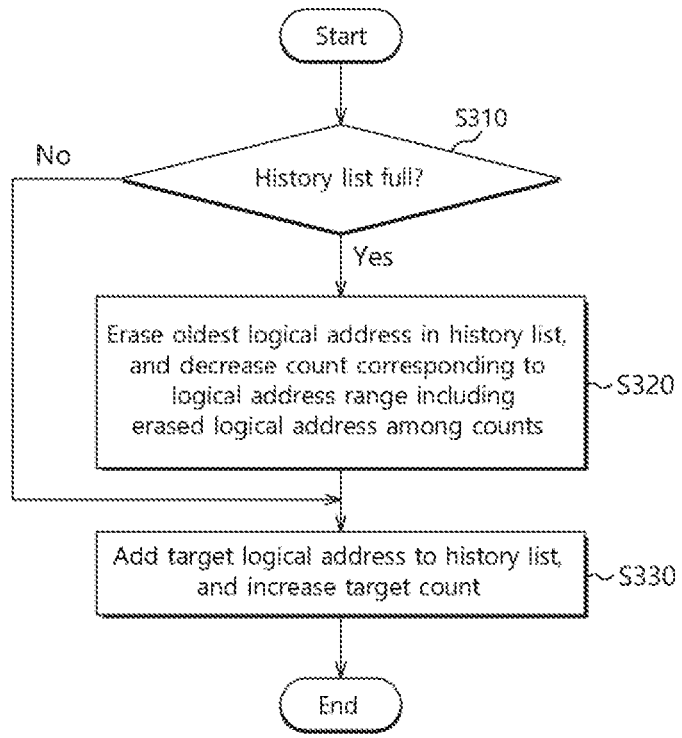
FIG. 5 is a flow chart illustrating a method for a sequential determination circuit to increase a target count, in accordance with an embodiment.

FIG. 5 is a flow chart illustrating a method for a sequential determination circuit to increase a target count, in accordance with an embodiment, for example, the sequential determination circuit 121 of FIG. 1. For example, FIG. 5 may be a detailed embodiment of the step S211 of FIG. 4A and the step S222 of FIG. 4B.

Referring to FIG. 5, at step S310, the sequential determination circuit 121 may determine whether the history list LIST is full. When it is determined that the history list LIST is full (S310, Yes), the process may proceed to step S320. When it is determined that the history list LIST is not full (S310, No), the process may proceed to step S530.

At the step S320, the sequential determination circuit 121 may erase an oldest logical address in the history list LIST, and may decrease a count corresponding to a logical address range including the erased logical address among the counts CNT.

At step S330, the sequential determination circuit 121 may add the target logical address to the history list LIST, and may increase the target count corresponding to the target logical address range including the target logical address.

Figure 6:
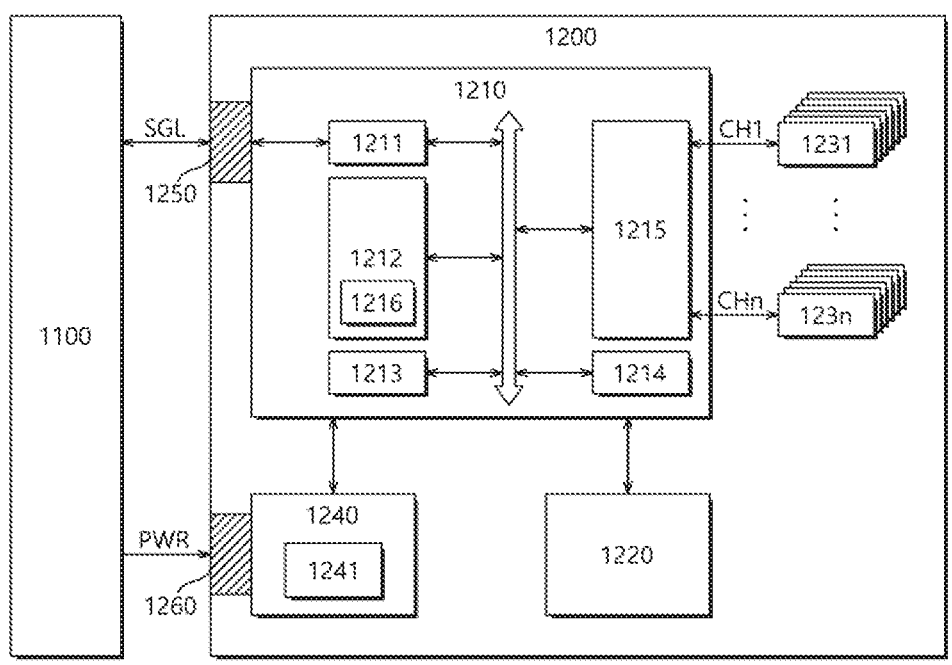
FIG. 6 is a diagram illustrating a data processing system including a solid state drive (SSD) in accordance with an embodiment.

FIG. 6 is a diagram illustrating a data processing system 1000 including a solid state drive (SSD) 1200 in accordance with an embodiment. Referring to FIG. 6, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e or PCIe) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The control unit 1212 may include a sequential determination circuit 1216. The sequential determination circuit 1216 may operate in the same manner as the sequential determination circuit 121 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 7:
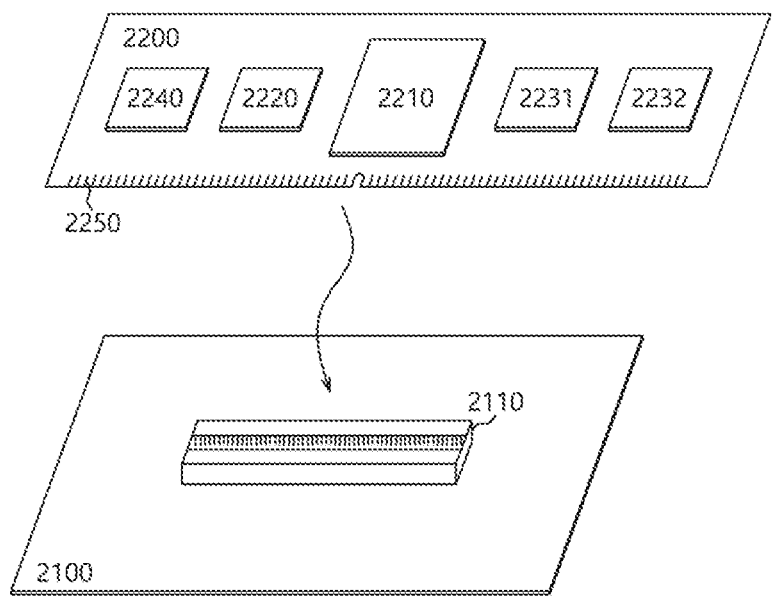
FIG. 7 is a diagram illustrating a data processing system including a memory system in accordance with an embodiment.

FIG. 7 is a diagram illustrating a data processing system 2000 including a memory system 2200 in accordance with an embodiment. Referring to FIG. 7, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot, or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 6.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 8:
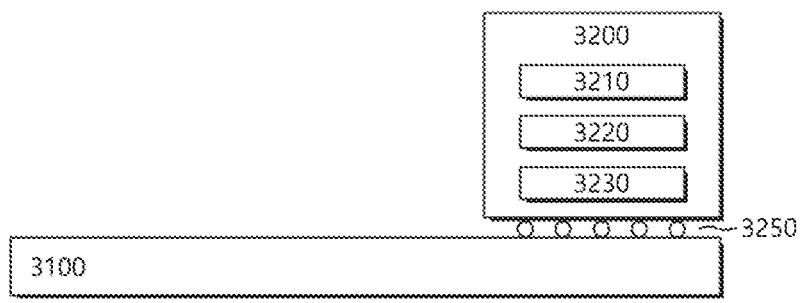
FIG. 8 is a diagram illustrating a data processing system including a memory system in accordance with an embodiment.

FIG. 8 is a diagram illustrating a data processing system 3000 including a memory system 3200 in accordance with an embodiment. Referring to FIG. 8, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 6.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 9:
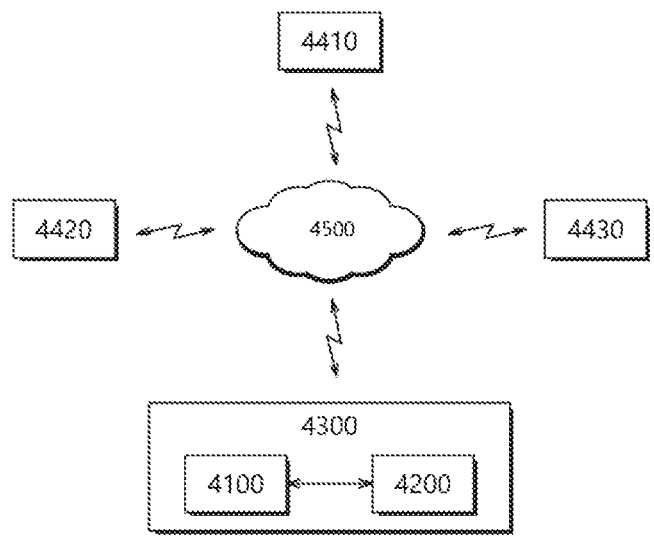
FIG. 9 is a diagram illustrating a network system including a memory system in accordance with an embodiment.

FIG. 9 is a diagram illustrating a network system 4000 including a memory system 4200 in accordance with an embodiment. Referring to FIG. 9, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 10 shown in FIG. 1, the memory system 1200 shown in FIG. 6, the memory system 2200 shown in FIG. 7 or the memory system 3200 shown in FIG. 8.

Figure 10:
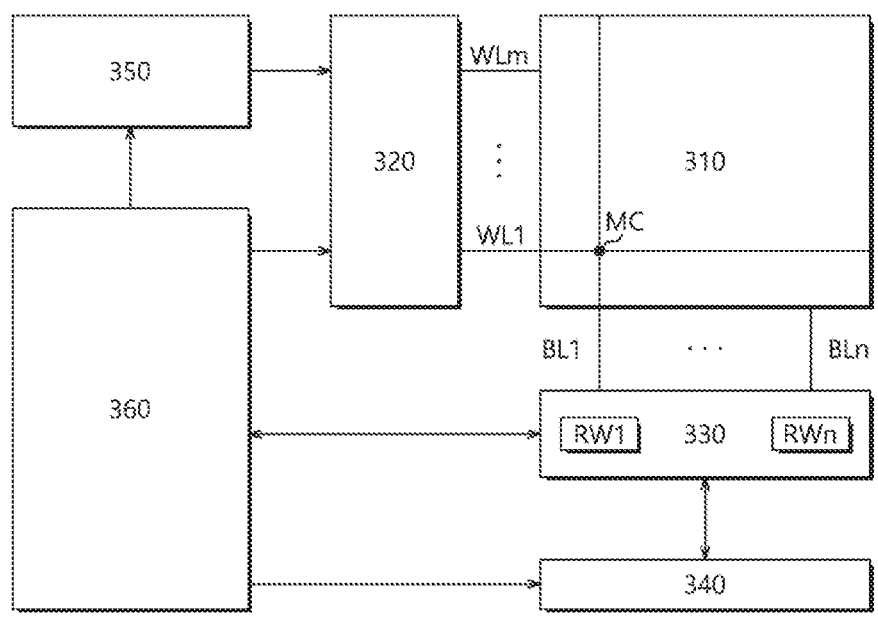
FIG. 10 is a block diagram illustrating a nonvolatile memory device included in a memory system in accordance with an embodiment.

FIG. 10 is a block diagram illustrating a nonvolatile memory device 300 included in a memory system in accordance with an embodiment. Referring to FIG. 10, the nonvolatile memory device 300 may include a memory cell array 310, a row decoder 320, a data read and write (read/write) block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (e.g., the controller 100 of FIG. 1). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the memory system and the operating method thereof described herein should not be limited based on the described embodiments.

What is claimed is:

1. A memory system comprising:
   a nonvolatile memory device; and
   a controller configured to receive an operation command for a target logical address from a host device, and control the nonvolatile memory device in response to the operation command,
   wherein the controller determines a target logical address range including the target logical address among a plurality of logical address ranges, and determines whether the target logical address has a sequential attribute, based on a target count corresponding to the target logical address range, among counts corresponding to the plurality of logical address ranges.

2. The memory system according to claim 1, wherein the controller increases the target count before or after determining whether the target logical address has the sequential attribute.

3. The memory system according to claim 2, wherein, in the case where a history list is not full, the controller adds the target logical address to the history list and increases the target count.

4. The memory system according to claim 3, wherein, in the case where the history list is full, before adding the target logical address to the history list, the controller erases an oldest logical address in the history list and decreases a count corresponding to a logical address range including the oldest logical address among the counts.

5. The memory system according to claim 3, wherein the history list comprises one or more logical addresses corresponding to one or more operation commands which are processed recently, in a sequence in which the logical addresses are processed.

6. The memory system according to claim 1, wherein the controller determines that the target logical address has the sequential attribute, when the target count is greater than or equal to a reference value.

7. The memory system according to claim 1, wherein the controller determines that the target logical address has a random attribute, when the target count is less than a reference value.

8. The memory system according to claim 1,
   wherein the nonvolatile memory device comprises a sequential region and a random region, and
   wherein the controller stores data corresponding to the target logical address in the sequential region or the random region, based on whether the target logical address has the sequential attribute.

9. The memory system according to claim 1, wherein, when the operation command corresponds to a plurality of target logical addresses, the controller selects any one of the plurality of target logical addresses as the target logical address, determines whether the target logical address has the sequential attribute, and determines attributes of remaining target logical addresses among the plurality of target logical addresses to be the same as an attribute of the target logical address.

10. An operating method of a memory system, comprising:
   determining a target logical address range including a target logical address corresponding to an operation command received from a host device, among a plurality of logical address ranges; and determining whether the target logical address has a sequential attribute, based on a target count corresponding to the target logical address range, among counts corresponding to the plurality of logical address ranges.

11. The operating method according to claim 10, further comprising:

increasing the target count before or after the determining of whether the target logical address has the sequential attribute.

12. The operating method according to claim 11, wherein the increasing of the target count comprises:

in the case where a history list is not full, adding the target logical address to the history list and increasing the target count.

13. The operating method according to claim 12, wherein the increasing of the target count further comprises:

in the case where the history list is full, before adding the target logical address to the history list, erasing an oldest logical address in the history list and decreasing a count corresponding to a logical address range including the oldest logical address among the counts.

14. The operating method according to claim 12, wherein the history list comprises one or more logical addresses corresponding to one or more operation commands which are processed recently, in a sequence in which the logical addresses are processed.

15. The operating method according to claim 10, wherein the determining of whether the target logical address has the sequential attribute comprises:

determining that the target logical address has the sequential attribute, when the target count is greater than or equal to a reference value.

16. The operating method according to claim 10, wherein the determining of whether the target logical address has the sequential attribute comprises:

determining that the target logical address has a random attribute, when the target count is less than a reference value.

17. The operating method according to claim 10, further comprising:

determining a region where data corresponding to the target logical address is to be stored, based on whether the target logical address has the sequential attribute.

18. The operating method according to claim 10, further comprising:

when the operation command corresponds to a plurality of target logical addresses, selecting any one of the plurality of target logical addresses as the target logical address to determine the target logical address range;

determining whether the target logical address has the sequential attribute; and determining attributes of remaining target logical addresses among the plurality of target logical addresses to be the same as an attribute of the target logical address.

19. A memory system comprising:

a memory device; and a controller suitable for:

receiving at least one command for the memory device and a sequence of logical addresses associated with the command;

determining an address range corresponding to each of the logical addresses, among a plurality of logical address ranges;

counting the number of each of the plurality of logical address ranges based on the determined address range; and determining whether each of the logical addresses is sequential, based on the counted number.

* * * * *